United States Patent [19]

Fakirov et al.

[11] Patent Number: 4,755,431

[45] Date of Patent: Jul. 5, 1988

[54] CHEMICALLY BONDED STRUCTURES OF POLYMERIC MEMBERS

[75] Inventors: Stoyko C. Fakirov, Sofia, Bulgaria; Jerold M. Schultz, Newark, Del.

[73] Assignee: University of Delaware, Newark, Del.

[21] Appl. No.: 102,940

[22] Filed: Sep. 30, 1987

[51] Int. Cl.$^4$ .............................................. B32B 7/04
[52] U.S. Cl. ................................... 428/420; 428/480; 428/910
[58] Field of Search ....................... 428/480, 420, 910

[56] References Cited

U.S. PATENT DOCUMENTS

| | | | |
|---|---|---|---|
| 4,251,565 | 2/1981 | Bowen | 428/420 |
| 4,439,479 | 3/1984 | Kanai et al. | 428/480 |
| 4,631,233 | 12/1986 | Kan | 428/420 |

*Primary Examiner*—Edith Buffalow
*Attorney, Agent, or Firm*—John A. Parkins

[57] ABSTRACT

The present invention relates to chemical bonded laminates generally, with condensation polymer laminae species.

1 Claim, No Drawings

CHEMICALLY BONDED STRUCTURES OF POLYMERIC MEMBERS

The Government of the United States of America has certain rights to this invention pursuant to National Science Foundation Grant No. INT-8206731.

This application is a division of application Ser. No. 777,991, filed 9/20/85, now U.S. Pat. No. 4,715,919, which was a continuation of Ser. No. 553,106, filed 11/18/83, now abandoned.

BACKGROUND OF THE INVENTION

Interfacially bonded structures or laminations fabricated from two or more oriented organic polymer films, sheets or strips in recent years have found widespread use in a variety of applications by virtue of the high level of mechanical properties that can be imparted to these components by orientation. Further exploitation of increasingly high levels of properties, however, has been hampered to some extent by certain limitations imposed by production methods and certain inherent characteristics of the materials themselves.

In this regard, biaxially oriented films of a good balance of properties can be produced, but in an effort to make biaxially oriented films of very high tensile strengths by sequential drawing, the high strength attained in the first direction draw is diminished by the second direction draw. Uniaxially oriented films have a very high level of tensile strength in the direction of orientation, but strength in the orthogonal direction is very low. Such films (especially those which are heat set) can fibrillate so easily that utility, even in applications primarily dependent upon the tensile strength in one direction, is impaired.

Cross-lapped structures of uniaxially oriented films, with the direction of orientation of adjacent layers at an angle to each other to utilize the very high tensile strengths of this type film have met with only limited success. This limitation is primarily caused by the inability to make fully satisfactory interlaminar bonds, the poor bonding resulting in delamination failures of the laminated structure.

Highly oriented films of condensation polymers such as polyethylene terephthalate (PET), are very poorly receptive to adhesives; only a very few complex costly adhesives can be used, and only after pretreatment of the film to render it more adherable. Adhesives commonly used, furthermore, have very low strength in bulk and in thin layer in comparison to the oriented polymer. Adhesively bonded structures, accordingly, cannot make optimum use of the potential of cross-lapped structures of uniaxially oriented films.

Likewise, fusion bonding of cross-lapped structures of uniaxially oriented film is less than satisfactory in capitalizing on the potential of such structures. In thermoplastic films of major commercial importance, such as representative condensation polymers PET, poly(butylene terephthalate) (PBT), the aliphatic polyamides (e.g., nylon 6 and nylon 66) and polyolefin addition polymers, fusion destroys orientation. In the art, U.S. Pat. No. 4,384,016 discloses fusion bonding of polymers which form liquid crystals in the melt. These are described as wholly aromatic condensation polymers. Any orientation imparted to these polymers, usually formed in melt drawing, is not only retained upon melting, but survives upon returning to the solid state. Polymers to which the present invention is directed are understood to not retain their oriented structure upon melting, but at best form collapsed coils. Accordingly, for the polymers covered by the present invention, fusion bonding is generally unsatisfactory.

SUMMARY OF THE INVENTION

Therefore, it is an object of the present invention to provide a laminate with an improved bond and a process for its formation between surfaces of solid, molecularly oriented polymers, with no substantial loss of molecular orientation.

It is a further object of the present invention to provide a bonded laminar structure and a process for its formation from oriented condensation polymer members not suitable for fusion bonding.

It is another object of the present invention to provide a bonded laminar structure and a process for its preparation from oriented polymeric members in which satisfactory bonds cannot be formed by an adhesive element.

These and other objects of the invention are achieved by chemical interaction across the interface of the laminae between molecules of each lamina. These interactions are accomplished in the solid state by three optional means:

(a) by postcondensation, such as occur in solid phase polycondensation, or by an interchange reaction between molecules of adjacent laminae;

(b) by interposition of coupling agents for polymeric chains, constituents of the laminae, into their interface; and (c) interposition of catalysts for interchange or condensation of constituent molecular chains into the interface of the laminae.

The particular conditions, heating times and temperatures and the use of agents to facilitate the reactions are a matter of choice depending upon requirements relating to the intended use of the joined product. The essence of the invention is that durable delamination-resistant bonds can be obtained without fusion, which would be accompanied by a significant loss of orientation, or the use of bonding materials which are adhesives per se.

DETAILED DESCRIPTION

In a broad sense, the present invention is directed to the establishment of chemical linkages between contacting solid members of a structure. These linkages involve the substances of the materials joined; they need not be between elements of identical compositions but only that the materials joined have polymeric entities capable of chemical reaction with polymeric entities of the other. For example, polyesters may be joined to polyamides by means of an amide linkage between an amide or amine group of the polyamide and a carboxyl group of the polyester. It is not necessary that the members of a bonded structure be of the same thickness or have other properties in common; one member may be oriented and the other need not be, depending upon the properties desired for a specific use. Structures other than film may be bonded provided they afford surfaces for intimate contact.

The essence of the present invention is that effective bonding of largely crystalline materials is accomplished in the solid state, below the melting temperature. This provides a means for bonding with their own substance of highly crystalline materials.

In view of the relatively inert nature of surfaces of materials such as oriented PET, it would not be expected that chemical bonding between structures could occur in the solid state. Solid phase polymerization at elevated temperatures wherein further condensation of oligomers or polymers of finely divided solids in fluidized beds is widely used. Such a process would be inoperable if the chemical reaction extended beyond the boundaries of separate particles; bonding and agglomeration would be prohibitive. In the present invention means for extension of polymer reactions across the interfacial boundary of separate bodies and the formation of chemical bonds between two bodies have been found.

Requirements for such reactions and bonding are:
(1) The surfaces of the bodies to be bonded must be brought into very intimate contact, preferably under pressure; and
(2) The contacting surfaces must be subjected to conditions for chemical reaction between molecular species of each surface.

The first of these requirements is most readily met by urging the surfaces together under mechanical pressure. Vacuum may be applied to exclude trapped air or to elimiate oxygen or volatile by-products of the reaction.

To meet the second requirement, several alternative means have been found:
(a) Heating the surfaces, before or after bringing them into contact, to an elevated temperature approaching but below the melting point, representative temperatures being 10°-100° C. below the melting point;
(b) Application to at least one of the surfaces to be bonded of a coupling agent effective to interact with groups on the polymeric chain of each of the bodies to be bonded and thereafter contacting the surfaces which are brought to a temperature effective to initiate interaction of the coupling agents and the polymeric chains; or
(c) Applying a catalyst for condensation or interchange reaction to at least one surface of a pair of surfaces to be bonded and bringing the surfaces into contact while at a temperature sufficient to activate an interchange or condensation reaction. For bonding polyesters, for example, but not limiting, poly(ethylene terephthalate) and poly(butylene terephthalate), zinc acetate, antimony oxide and germanium oxides in catalytic quantities are effective.

The choice from these methods depends upon the type and strength of the bond desired and production methods and facilities to be employed.

EXAMPLE 1

To establish that chemical bonding occurs across the interface between two contacting surfaces of films, samples of poly(ethylene terephthalate) were examined by the first of the aforesaid methods, the thermal or transreaction method, as follows.

Film samples employed were commercial poly(ethylene terephthalate) (PET) (Mylar ® polyester film, supplied by E. I. du Pont de Nemours and Co., Inc., Wilmington, Del.). This film had a thickness of 0.4 mm, was biaxially oriented and heat set to a crystallinity of about 35%. It had a melting point of 248° C., as determined by means of a Du Pont Differential Thermal Analyzer, Model 990, in a nitrogen atmosphere using a 5 mg sample of polymer heated at a temperature rise of 20° C./minute. Melting points were interpolated from the dH/dT vs. temperature curves. The molecular weights of the polymer in the samples were determined by gel permeation chromatography (GPC) in meta-cresol as a solvent. As received, the polymer in the film had a weight average molecular weight of 50,700.

To avoid sticking of the polymer sheets, (cut into strips of a typical width of 0.5 to 1 cm) as a result of partial melting and to assure that adhesion between strips would be due to chemical bond formation with a minimum of diffusion bonding, before bringing them into bonding contact they were annealed to increase crystallinity to a high value as possible. It had previously been observed that annealing increases the melting point, so the sample could be heated to a temperature above the initial melting point by simply bringing the film up to a temperature near the melting point in a slow, step-wise manner.

For this annealing the samples were clamped in a vise with Teflon ® fluorocarbon film to prevent sticking to the vise. Heating (stepwise increase from room temperature to just below the melting point) was for 6 hours in a vacuum following a nitrogen purge. After annealing, the samples had a crystallinity of 62%.

Samples, after annealing, for the thermally induced transreaction and postcondensation method were prepared in the following way. Two strips with a length of 3 cm were placed one over another with an overlap of between 1 cm and 2 cm. The samples were placed between two polished steel plates (with Teflon ® sheets over the metal surfaces) and pressed together in a drill press vise.

The heat-bonding process was conducted in an evacuated (oil pump) oven, previously purged with nitrogen. The samples were heated to 240° C. for times of 10, 20, 30, and 40 hrs.

This heat-bonding process resulted in bonding of all samples, accompanied by increases in melting point, degree of crystallinity and molecular weight. Tests with an Instron tensile tester for strength to break showed that when the overlap area (length) was large, the unbonded parts of the film of most samples broke before the bond failed by delamination under shearing stress. Conversely, when the overlap area was small, failure occurred largely by the shear failure of the bond. A critical bond length is computed from the intermediate case in which approximately 50% of the specimens failed by each mechanism. From the several samples bonded at several heating times in which the bond failed, representative values of the critical shear stress and the critical contact length were calculated. Critical contact length is the length of bond for which 50% of the specimens fail by interfacial debonding. In other words, the stress to break multiplied by the cross-sectional area of the film is equal to the shear stress to delaminate multiplied by bonded area. Since the width of each is the same, the relationship becomes: the stress-to-break multiplied by the film thickness is equal to the stress to shear times to critical bond length. The critical bond, then, is inversely related to the extent of bonding. Values these PET samples presented in Table I indicate a fairly constant (8.0 to 12.2) level of bond formation between laminae over a range of heating times.

TABLE I

| Sample Number | Bonding Time (hrs.) | M.P. T °C. | Crystallinity % | MW × 10⁻³ | Stress to Break Kg/cm² | Critical Bond Length mm |
|---|---|---|---|---|---|---|
| Annealed | 0 | 252 | 62 | 35.2 | 116 | — |
| 1 | 10 | 258 | 64 | 77.7 | 259 | 10.4 |
| 2 | 20 | 262 | 64 | 62.6 | 201 | 8.8 |
| 3 | 30 | 260 | 66 | 73.4 | 180 | 8.0 |
| 4 | 40 | 268 | 57 | 91.6 | 170 | 12.2 |

These data are indicative of bonding resulted since highly crystalline materials have few amorphous molecules with a mobility sufficient to diffuse across the boundary and bond. In practical applications, the annealing step which causes excessive crystallization and loss of orientation, might be omitted since diffusion bonding which would occur at lower crystallinity levels would not significantly harm or interfere with chemical, transreaction bonding by this process. The bond formed by the combination of chemical accompanied by other types of bonding could generally be more effectual than either alone, but chemical bonding could supplement the other types.

EXAMPLE 2

Alternative means, with coupling agents or by catalyst enhancement, could not only provide evidence of chemical bonding but could offer an attractive means of achieving chemical bonding with somewhat less severe conditions. Examples of the efficacy of these can be demonstrated by comparing the effect of bonding in the presence and absence of these agents. The time and temperature of heating, the pressure urging the surfaces into contact, ambient atmosphere, and the quantity and the composition of catalysts or coupling agents are technological variables and may be selected as appropriate by one skilled in the art.

Samples of Mylar ® polyester film similar to those the foregoing thermal method Example 1 were employed, but without annealing. This film was cut into strips 0.5 to 1 cm wide, 7–10 cm long; the ends of two strips were overlapped for a short distance to allow bond failure before film breakage. A control sample had the bare surfaces in contact at the overlap, samples for the coupling agent tests had a small quantity, approximately 100 mg and 10 mg, of the respective agents, spread over the surface of one strip to be contacted with the other strip. The overlapping areas of the respective strips were urged into intimate contact by being pressed together in Teflon ® protected jaws of a vise. They were heated in a nitrogen purged evacuated (oil pump) oven for 6 hours at a temperature of 240° C. After cooling the samples were qualitatively tested by hand pulling for evidence of bonding with results as follows:

TABLE II

| BONDING PET BY COUPLING AGENT ACTION ||
|---|---|
| Sample | Bonding Behavior |
| Control | No adhesion |
| Coupling Agent (1) | Good adhesion (5) |
| Coupling agent (2) | Good adhesion |
| Coupling agent (3) | Good adhesion |

TABLE II-continued

| BONDING PET BY COUPLING AGENT ACTION ||
|---|---|
| Sample | Bonding Behavior |
| Coupling agent (4) | Good adhesion |

Notes:
(1) Pyromellitic acid
(2) Benzophenone tetracarboxylic acid
(3) Oxalic acid
(4) Malonic acid
(5) Good bond adhesion indicated by tough bond which in a few cases only could be separated by severe twisting.

EXAMPLE 3

Further examples of coupling poly(ethylene terephthalate) and poly(butylene terephthalate) with the agents indicated in Example II were conducted with the stress to shear determined with an Instron tensile tester.

Biaxially oriented, heat set PET film (Du Pont "Mylar" polyester film) of 0.4 mm thickness was bonded, as in Example 2 but without annealing the film before bonding. Results are indicated in Table III. Film samples, 0.6 to 0.95 cm in width with a 1.2 cm overlap were urged into intimate contact in a vise and heated to 240° C. for 6 hours. The films were not annealed before bonding so embrittlement was insignificant. Coupling agents identified by numerals are as indicated in Table II. Dry coupling agents or in tetrahydrofurane (THF) solution was spread on the surface to be bonded.

TABLE III

| COUPLING AGENT | STATE | SHEAR STRESS Kg/cm² |
|---|---|---|
| (1) | Solid | 10.9 |
|  | Soln. | 14.6 |
| (2) | Solid | 13.5 |
|  | Soln. | 7.1 |
| (3) | Solid | Film Failed |
|  | — | — |
| (4) | Solid | 8.8 |
|  | Soln. | 5.9 |
| Control | — | None |

EXAMPLE 4

Samples of PBT film 0.5 to 1 mm in thickness, with other dimensions as similar PET samples in Example III were comparably overlapped and urged into contact in a vise. They were heated to 195° C. for 15 hours. Also included were two samples of ester interchange catalyst, zinc acetate, as indicated in Table IV. All agents were in the solid state.

TABLE IV

| AGENT OR CATALYST | SHEAR STRESS (Kg/cm²) |
|---|---|
| (1) | Film Failed |
| (2) | 10.75 |
| (3) | 4.27 |
|  | 2.99 |
| (4) | 2.98 |
| (1) + Zn(OAC)₂ | 2.69 |
| Zn(OACO₂ | 3.17 |

EXAMPLE 5

Two nylon 12 (—(CH$_2$)$_{11}$—CONH—) film strips melting point 194° C., thickness approximately 0.5 mm, were subjected without prior annealing to thermally-induced bonding at 140° C. for 1 hour, as in Example 1. The bonded samples were subjected to a tensile stress to determine bond strength. The unbonded portions of the strips necked and elongated without failure of the bonds. These very strong bonds were formed at 54° C. below the melting temperature.

EXAMPLE 6

Samples of oriented poly(ethylene terephthalate), thickness ca 0.05 mm, coated on overlapping areas with the monomer di(hydroxyethyl)terephthalate, pressed in a vise and heated to 150° C. for 30 minutes show good bonding and no significant loss of orientation as indicated by tensile strength.

EXAMPLE 7

Samples of polyamide film, nylon 66 (m.p. 265° C.), thickness ~0.2 mm were examined for bonding by the method of Example 1 except that before urging them into contact for bonding, they were not annealed. Samples were tested for thermally induced bonding (trans-reaction) between surfaces of the polyamide, between the polyamide and PET and between the polyamide and PBT, all heated for bonding for 6 hours. Significant preparation and testing details with results are summarized in Table V.

TABLE V

| Laminate Components | Bonding Temp. °C. | Stress at Film Break kg/cm$^2$ | Stress at Bond Failure kg/cm$^2$ | Notes |
| --- | --- | --- | --- | --- |
| Nylon 66 - Nylon 66 | 248 | — | 8.5 | (1) |
| Nylon 66 - Nylon 66 | 240 | — | 12.5 | (1) |
| Nylon 66 - PET | 248 | 35 | — | (2) |
| Nylon 66 - PBT | 210 | 55 | 0 | (2) |

Notes:
(1) Bond failed before film breakage.
(2) Film broke before bond failure.

The foregoing examples are illustrative of chemical bond formation across the interface of intimately contacting bodies. The thermally-induced bonding method is drastic, primarily with its annealing to high crystallinity to minimize the presence of amorphous molecules to put emphasis on the role of chemical bonding. A detrimental effect on orientation probably resulted, although the samples in the vise were under restraint which could reduce relaxation of orientation. But it showed self-bonding without fusion of oriented polycondensates. Operators skilled in the art could employ the adjuncts of coupling agents and catalysts, along with flash heating (flame) of the surfaces at the junction as films are brought together in a nip rolls for bonding to minimize heating the bulk of the film and accelerate bonding. Such would help retain orientation.

Examples show applicability of the invention not only to bonding of surfaces of the same composition, but also of different compositions. The method includes chemical bond formation with representative aromatic aliphatic polyesters such as poly(ethylene terephthalate), poly(butylene terephthalate), and poly(1,4 cyclohexane dimethylene terephthalate). Polycarbonate and cross-linked polyesters used for potting resins can be bonded by this method. Polyamides, principally the aliphatic polyamides, but also the all-aromatic polyamides can be bonded. Typically, nylon 6, nylon 66 and nylon 12 are useful.

Structures adapted to the present invention are not limited to films, which for convenience were employed in the examples to illustrate bonding without fusion, but the process is adapted to other structures having surfaces for the required contact. These structures to which the invention is adapted include straps, bands, billets, tubes, pipes, and rods. Pipe structures and cable wraps with cross-lapped strip windings of uniaxially oriented film bonded at the laps are tightly resistant to bursting and are a major use for the method. Welding of composite sheets and rods, including rods such as fiber-reinforced cross-linked polyester fishing rods are of major interest. Rib-reinforced panels, a pair of adhered sheets formed with ribs on one sheet for beam-like strength, could advantageously employ the present invention. Such structures are made by positioning the sheets between a pair of heated platens, at least one having cavities for forming ribs as air is drawn into the cavities through the interface of the sheets. After rib formation the sheets are urged together and bonded. Adhesives give problems with premature sticking. Chemical bonding according to this invention obviates this and permits the use of oriented sheets.

Chemical bonding of other than condensation polymers is illustrated in co-pending U.S. patent application Ser. No. 553,103 filed 11-18-83 with a common assignee and two of the three co-inventors common to the present application. The invention disclosed in that application relates to chemical bonding of polyolefin laminae by the action of cross-linking initiators. That application is incorporated herein by reference.

We claim:

1. A bonded laminate of crystalline, oriented linear polyester laminae, the laminae being of a composition which loses its crystallinity and orientation upon melting and having a high level of tensile strength imparted by orientation, the bonds being chemical bonds formed by solid state reaction between molecules of each lamina across the interface of contacting surfaces of the laminae by the steps in sequence comprising:

application to at least one of two adjacent surfaces to be bonded of an agent effective in the absence of externally applied radiation to cause chemical reaction between molecules of adjacent laminae;

bringing surfaces having said agent on at least one surface to be bonded together to form a laminate;

urging the surfaces to be bonded into intimate contact with pressure; and heating the laminate while being urged into contact to a temperature from 10° C. to 100° C. below the melting point of the polyester of the laminate to form a chemically bonded laminate characterized by a high level of tensile strength imparted each lamina by orientation before lamination.

* * * * *